(No Model.)

W. H. HULTGREN.
THRUST BEARING.

No. 468,043. Patented Feb. 2, 1892.

Witnesses:-
Louis M. F. Whitehead.
John E. Wiles.

Inventor:-
William H. Hultgren.

By:- Dayton, Poole & Brown
Attorneys:-

UNITED STATES PATENT OFFICE.

WILLIAM H. HULTGREN, OF CHICAGO, ILLINOIS, ASSIGNOR OF ONE-HALF TO ALBERT B. ELLITHORPE, OF SAME PLACE.

THRUST-BEARING.

SPECIFICATION forming part of Letters Patent No. 468,043, dated February 2, 1892.

Application filed December 29, 1890. Serial No. 376,069. (No model.)

*To all whom it may concern:*

Be it known that I, WILLIAM H. HULTGREN, of Chicago, in the county of Cook and State of Illinois, have invented certain new and useful Improvements in Thrust-Bearings; and I do hereby declare that the following is a full, clear, and exact description thereof, reference being had to the accompanying drawings, and to letters of reference marked thereon, which form a part of this specification.

My invention relates to bearings which are designed to resist the endwise thrusts of the power-shafts of various types of machines, and while in the present instance my invention is especially intended for application to the worm-shafts of hoisting-machines it is equally applicable to the thrust-bearings of propeller-shafts and various other machines.

The objects of my invention are to remove the wear as much as possible from the end of the shaft itself and to insure the free entrance and circulation of lubricating-fluid throughout the several contact-surfaces of the bearing, so as to prevent heating and wear of the same, and also to permit of the ready removal and renewal of the parts composing the bearing proper.

To the above purposes my invention consists in certain novel features of construction and arrangement, as hereinafter described, and pointed out in the appended claims.

In order that my invention may be fully understood, I will describe it with reference to the accompanying drawings, in which—

Figure 1:
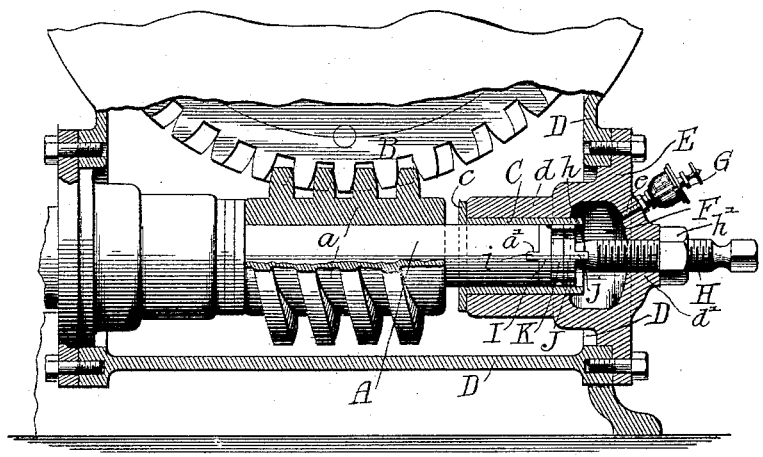
Figure 2:
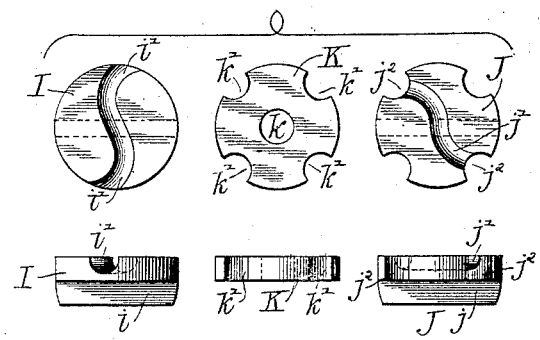

Figure 1 is a central longitudinal section of a thrust-bearing constructed in accordance with my invention. Fig. 2 illustrates in detached condition a group of the several bearing-plates composing the bearing proper.

In the said drawings, A designates the worm-shaft of a hoisting-machine, and $a$ the worm thereon, which meshes with the teeth of a worm-wheel B by which the hoisting-drum is revolved. The rear end of this shaft A is inserted into a tubular bushing C, which is set into a hub-like boss $d$, as shown, a circular external flange $c$ on the front end of the bushing C being provided to rest against the forward end of the hub $d$, and thus prevent displacement of the bushing.

E designates the cap of the bearing-frame, on the inner side of which the hub $d$ is formed, as shown, and which is bolted or otherwise firmly secured to the frame D in vertical position. A chamber or reservoir F is formed in the center of the cap E and communicates directly with the interior or bore of the hub $d$, and a short duct $e$ leads from said chamber and communicates at its outer end with an oil-cup or lubricator G of any suitable or preferred type.

H designates a screw, which is inserted horizontally through a threaded external box or hub $d'$, formed centrally in the cap E. Said screw H forms an adjustable abutment, which takes the end thrust of the shaft. The rear end of the shaft A is formed with a transverse notch or groove $a'$, extending entirely across its rear extremity and into which fits a steel disk I. This disk is of the same diameter as the shaft A, and, as shown, abuts closely against the end of the latter. On the opposite face of the disk I from the rib $i$ is formed a radial or transverse channel or groove $i'$, preferably of S shape, the ends of which terminate at the margin of the disk, as shown.

J designates a steel disk, which abuts against the inner end of the screw H, and which on its outer face is formed with a transverse rib $j$, which enters a transverse notch or groove $h$ in the inner end of the screw H. The face of the disk J opposite to that upon which the rib $j$ is formed is provided with a radial or transverse groove or channel $j'$, preferably of S shape, which extends transversely of the disk and the ends of which terminate in recesses $j^2$ in the margin of said disk J.

K designates a brass disk, which is formed with a central aperture $k$, extending entirely through its body. This disk K is also formed with a number of marginal recesses or notches $k'$, for a purpose to be presently explained. As will be seen by reference to the drawings, the disk K is interposed between the disks I and J and the channels $i'$ $j'$ of the disks I J lie in contact with the opposite sides or faces of the disk K. Now when the screw-bolt H has been set up or tightened, so as to properly bind the disks I J K against each other, it is held by the jam-nut $h'$ and the lubricant is fed into the chamber F from the oil-cup or lubricator G. As the shaft revolves, the lubricant is fed through the marginal notches $j^2$ of the disk J and enters the transverse groove or channel $j'$ of said disk. From the groove $j'$ the lubricant passes through the central aperture $k$ of the disk K and enters the groove $i'$ of the disk I. From the grooves $j'$ and $i'$ and the several notches the lubricant is thoroughly fed to the several friction-surfaces of the bearing. It will be seen that the curved form of the channels $i'$ $j'$ tends to produce a drawing action upon the lubricating-fluid, which causes it to constantly and thoroughly circulate between the contiguous faces of the disks and also around their margins and also generally throughout the friction-surfaces of the bearing. The disk J next to the screw-bolt H remains stationary at all times and the disk I revolves constantly with the shaft A, while the intermediate disk K has a more or less constant rotation produced by contact with the disk I. These relatively fixed and movable disks serve to insure the thorough distribution of the lubricating-fluid throughout the bearing as a whole, and to lessen the friction by dividing it between the two sets of contact-surfaces. Thus it will be seen that the frictional wear in the bearing is reduced to a minimum and that liability of the heating of the bearing is greatly lessened. It is obvious that by removing the cap E free access is had to the interior of the bearing and one or all of the disks may be removed and others substituted when required. It being obvious that two or more than two radial grooves may be substituted for the single groove $i'$ or the groove $j'$ without departing from the spirit of my invention, I have omitted to illustrate such obvious substitution or the mere duplicating of the said grooves. It is obvious, furthermore, that a movable or endwise adjustable abutment may be formed otherwise than by the screw H, and my invention is not therefore limited to this particular form of such abutment.

I claim as my invention—

1. In a thrust-bearing, a disk located in direct contact with and adapted to be rotated by a shaft, said disk being provided on one side with a radial oil channel or groove, a non-rotating disk located at the opposite part of the bearing and provided on one side with a radial oil channel or groove and having a number of marginal oil-receiving recesses, and a third disk interposed between the first two-named disks and having also marginal oil-receiving recesses and being provided with a central aperture for carrying the lubricant from one disk to the other, substantially as described.

2. The combination, with the cap having an oil-chamber and bearing-aperture, of a shaft having a notch across its bearing end, an adjustable abutment having a similar notch across its inner end, bearing-disks I J, each being provided with suitable ribs adapted to fit the notches in the said shaft and abutment, respectively, and each being provided with a radial oil-channel, and an intermediate disk having a central aperture, said intermediate disk and one or both of the said bearing-disks I or J being provided with marginal recesses, substantially as described.

In testimony that I claim the foregoing as my invention I affix my signature in presence of two witnesses.

WILLIAM H. HULTGREN.

Witnesses:
C. CLARENCE POOLE,
JOHN E. WILES.